US006892320B1

(12) United States Patent
Roush

(10) Patent No.: US 6,892,320 B1
(45) Date of Patent: May 10, 2005

(54) METHOD AND APPARATUS FOR PROVIDING MULTIPLE-VERSION SUPPORT FOR HIGHLY AVAILABLE OBJECTS

(75) Inventor: Ellard T. Roush, Burlingame, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 528 days.

(21) Appl. No.: 10/160,509

(22) Filed: Jun. 3, 2002

(51) Int. Cl.[7] .............................................. G06F 11/00
(52) U.S. Cl. ........................... 714/15; 714/19; 707/203; 717/170; 717/171
(58) Field of Search ................................ 717/170, 171; 714/15, 17, 16, 19; 707/203

(56) References Cited

U.S. PATENT DOCUMENTS

| | | | |
|---|---|---|---|
| 5,577,232 A | * 11/1996 | Priem et al. ................. 717/170 |
| 6,185,695 B1 | * 2/2001 | Murphy et al. ................. 714/4 |
| 6,332,200 B1 | * 12/2001 | Meth et al. ................... 714/16 |
| 6,425,125 B1 | * 7/2002 | Fries et al. ................. 717/168 |
| 6,584,476 B1 | * 6/2003 | Chatterjee et al. .......... 707/203 |
| 6,594,779 B1 | * 7/2003 | Chandra et al. .............. 714/15 |
| 6,691,245 B1 | * 2/2004 | DeKoning ..................... 714/6 |
| 6,823,474 B2 | * 11/2004 | Kampe et al. ................. 714/13 |
| 2002/0103819 A1 | * 8/2002 | Duvillier et al. ............ 707/206 |

* cited by examiner

*Primary Examiner*—Robert Beausoliel
*Assistant Examiner*—Christopher McCarthy
(74) *Attorney, Agent, or Firm*—Park, Vaughan & Fleming LLP

(57) ABSTRACT

One embodiment of the present invention provides a system that supports multiple versions of highly available objects. A highly available object is a primary object and one or more secondary objects. In an environment supporting multiple versions, the client, the primary, and the secondary objects can each be running either old or new software. Highly available objects introduce a need to process checkpoints where the primary and each of the secondary objects can be at different software versions. In one such situation, the system receives a change to a new version primary object at a node running new version primary software. Next, the system creates a new version checkpoint from this change and distributes the new version checkpoint to nodes executing new version software. The system also translates the new version checkpoint into an old version checkpoint and distributes this old version checkpoint to nodes executing old version software. Note that system can similarly handle an invocation retry where the newly promoted primary object can be an older or newer version.

36 Claims, 7 Drawing Sheets

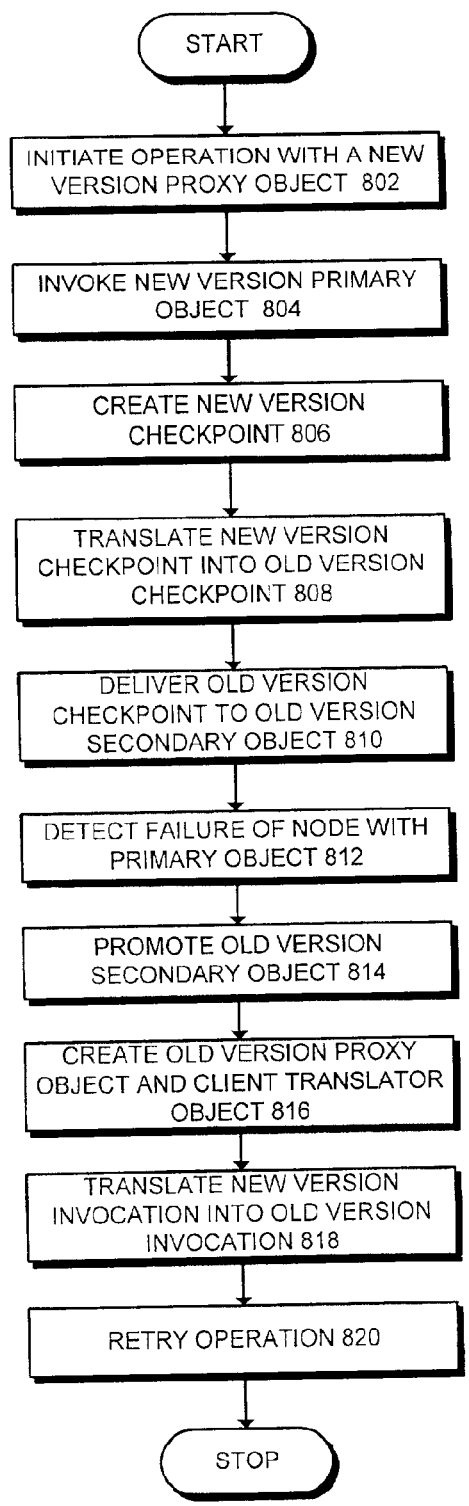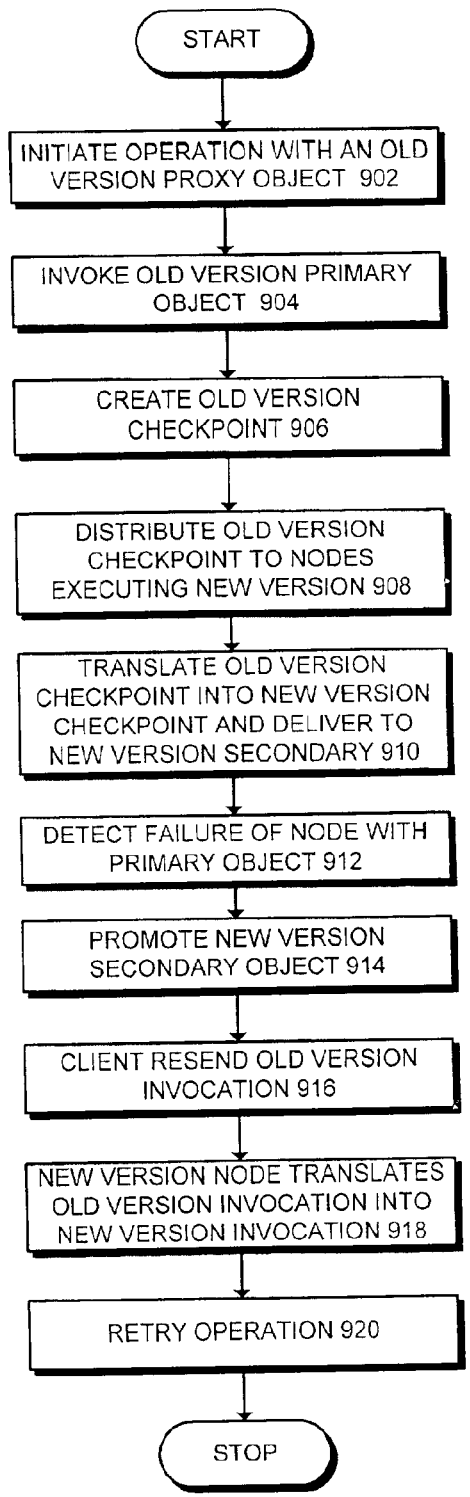
FIG. 8                    FIG. 9

METHOD AND APPARATUS FOR PROVIDING MULTIPLE-VERSION SUPPORT FOR HIGHLY AVAILABLE OBJECTS

BACKGROUND

1. Field of the Invention

The present invention relates to providing fault-tolerance in computer systems. More specifically, the present invention relates to a method and an apparatus that provides multiple-version support for highly available objects.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access information contained in a database on a server computer system. When the server fails, it is desirable for the distributed operating system to automatically recover from this failure. Distributed computer systems with distributed operating systems possessing an ability to recover from such server failures are referred to as "highly available systems." Objects stored on such highly available systems are referred to as "highly available objects."

For a highly available system to function properly, the highly available system must be able to detect a server failure and to reconfigure itself so accesses to objects on the failed server are redirected to backup copies on other servers. This process of switching over to a backup copy on another server is referred to as a "failover."

FIG. 1 illustrates a system that supports highly available objects in accordance with an embodiment of the present invention. This system includes computational nodes 102, 104, 106, and 108. During operation, client 110 on node 102 sends invocation 126 to node 104 to operate on primary object 112.

In response to this invocation, a number of checkpointing operations take place. In particular, primary object 112 sends checkpoint request 130 to checkpoint object 114. Checkpoint object 114 generates checkpoint 132, which feeds into checkpoint handler 116. Checkpoint handler 116 adds information, such as a serial number, to checkpoint 132 and then passes checkpoints 134 and 136 to nodes 106 and 108, respectively. After checkpoints 134 and 136 have been delivered to nodes 106 and 108, primary object 112 sends reply 128 to client 110.

Upon receiving checkpoint 134, checkpoint object 118 within node 106 ensures correct ordering of checkpoints and then passes checkpoint 138 to secondary object 120. Similarly, upon receiving checkpoint 136, checkpoint object 122 within node 108 ensures correct ordering of checkpoints and then passes checkpoint 140 to secondary object 124.

At some time in the future, if node 104 fails, the system selects either secondary object 120 or 124 to be promoted to a primary object. Client 110 then completes any outstanding operations using the newly promoted primary object.

Software running on the various computers in a cluster is often updated to correct problems in the software and/or to add new features. However, it is not a simple matter to update software in a highly available clustered computing system without halting the entire system for a significant period of time. Note that it is possible for individual nodes in a cluster to be temporarily halted to load updated software without bringing the entire system down. However, if some nodes are running the updated software and other nodes are not, there can be incompatibilities between different versions of the software that facilitate highly available objects.

What is needed is a method and an apparatus that allows software to be updated within a cluster without halting the entire system and without incompatibility problems between different versions of the software.

SUMMARY

One embodiment of the present invention provides a system that supports multiple versions of highly available objects. During operation, the system receives a change to a new version primary object at a node running new version primary software. Note that this new version primary object is a highly available object. Next, the system creates a new version checkpoint from this change and distributes the new version checkpoint to nodes executing new version software. The system also translates the new version checkpoint into an old version checkpoint and distributes this old version checkpoint to nodes executing old version software.

In one embodiment of the present invention, receiving the change to the new version primary object includes receiving an invocation for the new version primary object.

In one embodiment of the present invention, the system delivers the new version checkpoint to a new version secondary object at a node executing new version software.

In one embodiment of the present invention, upon detecting failure of the node hosting the new version primary object, the system promotes the new version secondary object to be a new version primary object. The system then retries the operation using the promoted object.

In one embodiment of the present invention, the system delivers the old version checkpoint to an old version secondary object at a node executing old version software.

In one embodiment of the present invention, upon detecting failure of the node hosting the new version primary object, the system promotes the old version secondary object to be an old version primary object. The system can retry an invocation from a new version client. In this case, the system translates the new version client invocation on the client side into an old version invocation. The old version primary processes this old version invocation.

One embodiment of the present invention provides a system that supports multiple-versions of highly available objects. During operation, the system receives a change to an old version primary object at a node running old version primary software from a client node. This old version primary object is a highly available object. The system creates an old version checkpoint from this old version primary object and distributes the old version checkpoint to nodes executing old version software. The system also distributes the old version checkpoint to nodes executing new version software. The nodes executing the new version software translate the old version checkpoint into a new version checkpoint.

In one embodiment of the present invention, receiving the change to the old version primary object includes receiving an invocation for the old version primary object.

In one embodiment of the present invention, the system delivers the old version checkpoint to an old version secondary object at a node executing old version software.

In one embodiment of the present invention, upon detecting failure of the node hosting the old version primary object, the system promotes the old version secondary object to be an old version primary object. The system then retries the operation using the promoted old version primary object.

In one embodiment of the present invention, the system delivers the old version checkpoint to a node running new version software, where the system translates the old version checkpoint into a new version checkpoint before delivering the checkpoint to the new version secondary.

In one embodiment of the present invention, upon detecting failure of a node hosting the old version primary object, the system promotes the new version secondary object to be a new version primary object. The system can retry an invocation from an old version client. In this case, the system translates the old version client invocation on the server side into a new version invocation. The new version primary processes this new version invocation.

BRIEF DESCRIPTION OF THE FIGURES

FIG. 8 is a flowchart illustrating the process of retrying an operation started with a new version primary object using an old version primary object in accordance with an embodiment of the present invention.

FIG. 9 is a flowchart illustrating the process of retrying an operation started with an old version primary object using a new version primary object in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Delivering Checkpoints from a New Version Primary Object

Figure 2:
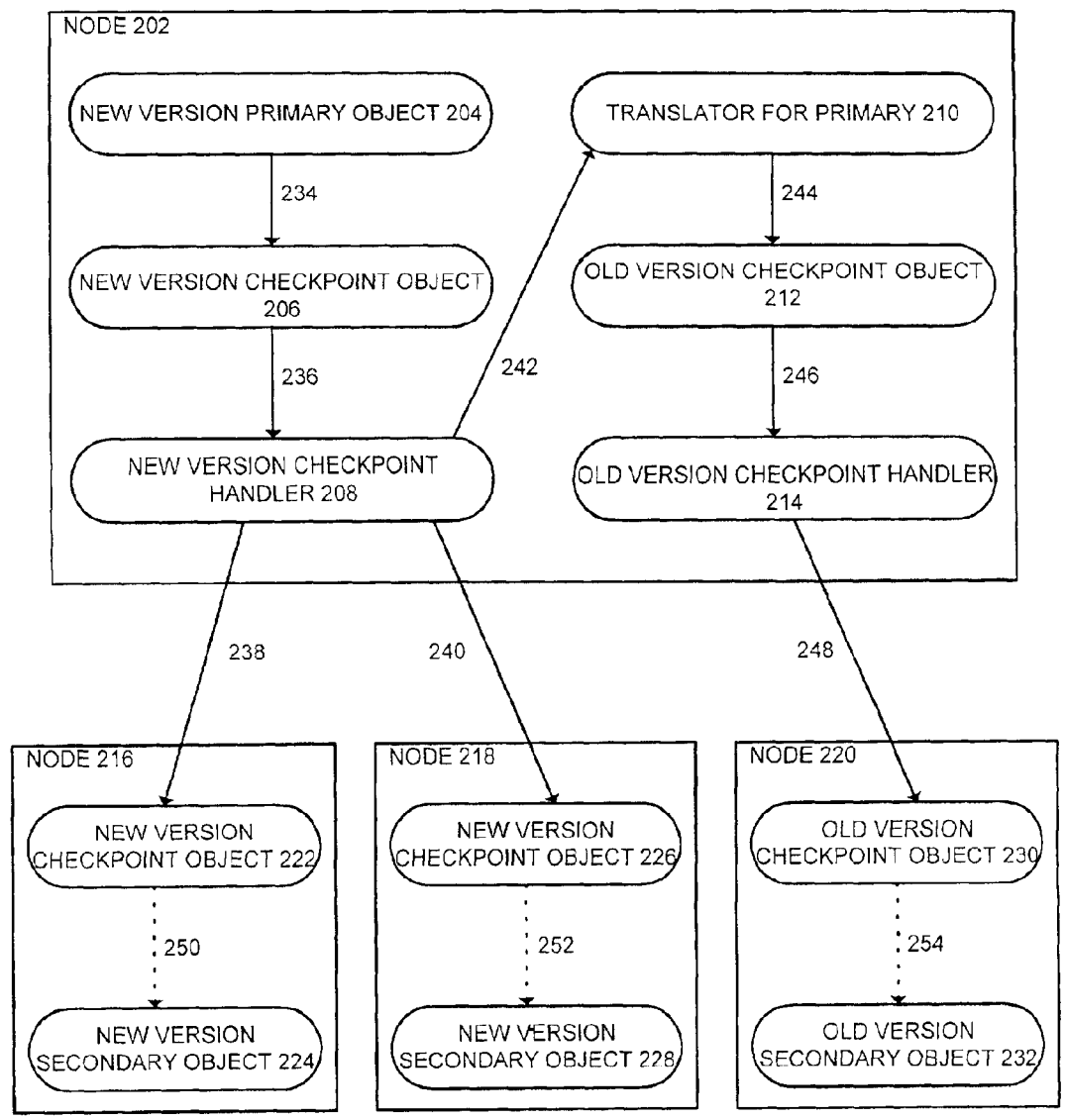
FIG. 2 illustrates the process of delivering checkpoints from a new version primary to both old and new secondary objects in accordance with an embodiment of the present invention.

FIG. 2 illustrates the process of delivering checkpoints from a new version primary to both old and new secondary objects in accordance with an embodiment of the present invention. The system illustrated in FIG. 2 includes nodes 202, 216, 218, and 220. Nodes 202, 216, 218, and 220 can generally include any type of computer system, including, but not limited to, a computer system based on a microprocessor, a mainframe computer, a digital signal processor, a portable computing device, a personal organizer, a device controller, and a computational engine within an appliance.

Node 202 includes new version primary object 204. New version primary object 204 can be newly invoked by a client (not shown) or can have been changed from a previous state. New version primary object 204 initiates a checkpoint with checkpoint request 234 to new version checkpoint object 206. New version checkpoint object 206 creates checkpoint 236 and sends checkpoint 236 to new version checkpoint handler 208.

New version checkpoint handler 208 distributes checkpoint 236 after adding a sequence number to the checkpoint. As shown, new version checkpoint handler 208 sends checkpoints 238 and 240 to new version checkpoint object 222 within node 216 and new version checkpoint object 226 within node 218, respectively. New version checkpoint handler 208 also sends checkpoint 242 to translator for primary 210. Note that there may be multiple translators if more than two versions of software exist within the cluster.

Translator for primary 210 converts new version checkpoint 242 to old version checkpoint 244 and passes checkpoint 244 to old version checkpoint object 212. Old version checkpoint object 212, in turn, passes checkpoint 244 to old version checkpoint handler 214 as checkpoint 246. Old version checkpoint handler 214 adds a sequence number to checkpoint 246 and passes the old version checkpoint including sequence number to old version checkpoint object 230 as checkpoint 248. The sequence number for checkpoint 248 comes from the sequence number in checkpoint 242. Note that there can be more than one node executing the old version software.

After new version checkpoint object 222 within node 216 receives checkpoint 238, new version checkpoint object 222 ensures correct ordering of the checkpoints using the sequence number and then passes checkpoint 250 to new version secondary object 224. Similarly, after new version checkpoint object 226 within node 218 receives checkpoint 240, new version checkpoint object 226 ensures correct ordering of the checkpoints using the sequence number and then passes checkpoint 252 to new version secondary object 228. In the case of the old version checkpoint, after old version checkpoint object 230 within node 220 receives checkpoint 248, old version checkpoint object 230 ensures correct ordering of the checkpoints using the sequence number and then passes checkpoint 254 to old version secondary object 232. If node 202 fails, the system chooses secondary object 224, 228, or 232 to promote to a primary object. The newly promoted primary object is then used to complete any outstanding operations.

Delivering Checkpoints from an Old Version Primary Object

Figure 3:
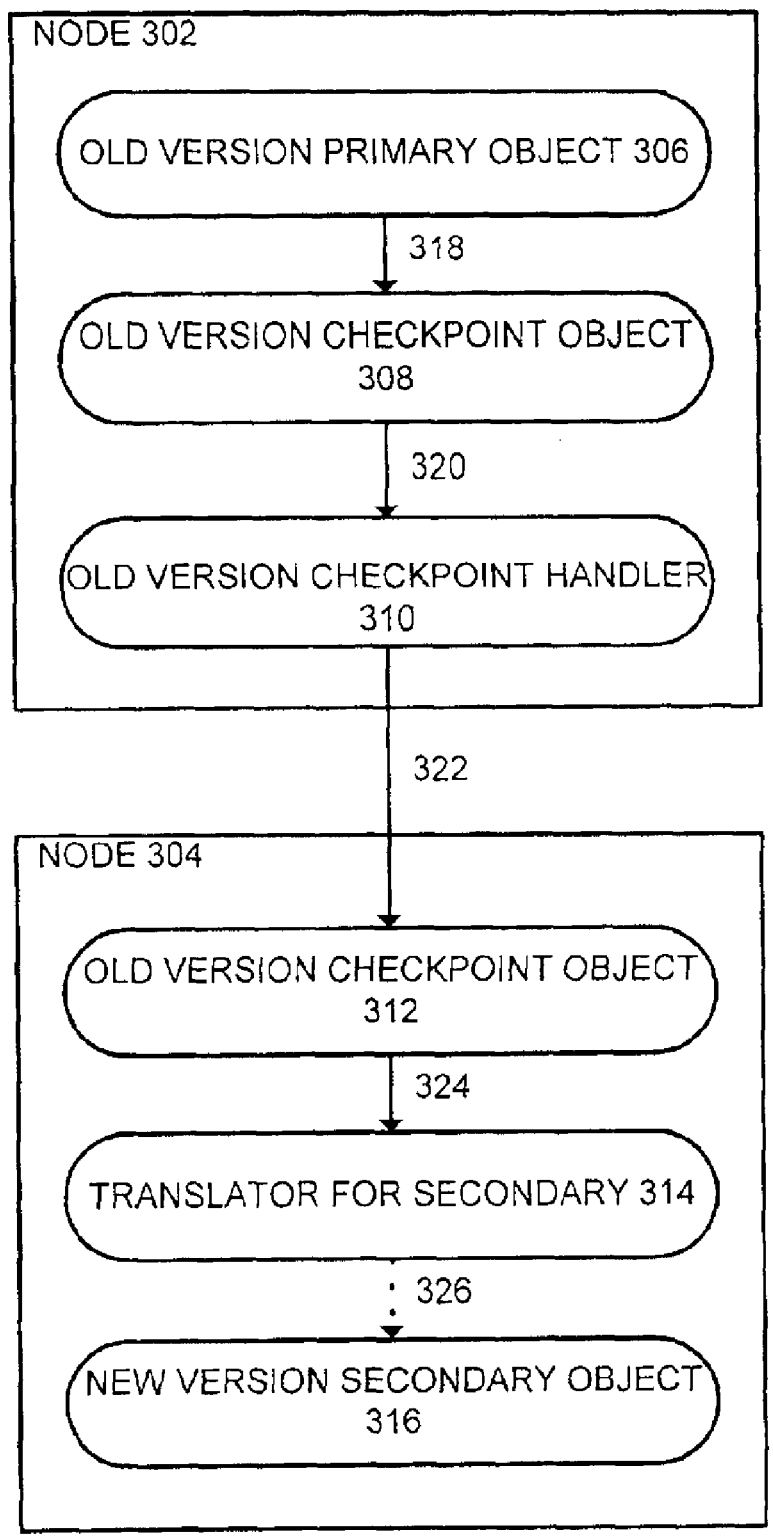
FIG. 3 illustrates the process of delivering checkpoints from an old version primary object to a new version secondary object in accordance with an embodiment of the present invention.

FIG. 3 illustrates the process of delivering checkpoints from an old version primary object to a new version secondary object in accordance with an embodiment of the present invention. Node 302 hosts old version primary object 306. Old version primary object 306 can be newly invoked by a client (not shown) or can have been changed from a previous state. Old version primary object 306 initiates a checkpoint with checkpoint request 318 to old version checkpoint object 308. Old version checkpoint object 308 creates checkpoint 320 and sends checkpoint 320 to old version checkpoint handler 310.

Figure 1:
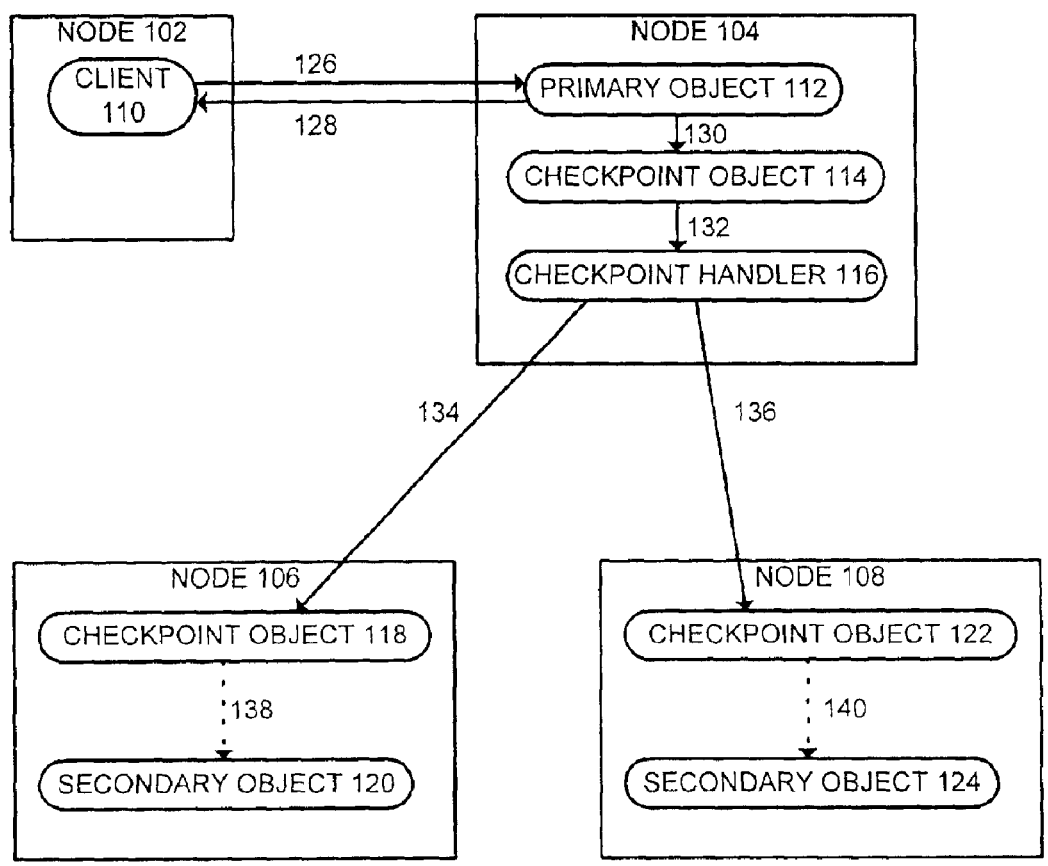
FIG. 1 illustrates a system with a highly available object including checkpoints.

Old version checkpoint handler 310 distributes checkpoint 320 after adding a sequence number to the checkpoint. As shown, old version checkpoint handler 310 sends checkpoint 322 to old version checkpoint object 312 within node 304. Old version checkpoint handler 310 can also send checkpoint 242 to other nodes executing both old and new version software. Nodes executing old version software operate as described above in conjunction with FIG. 1.

Node 304 is executing new version software. Upon receiving checkpoint 322, old version checkpoint object 312 ensures that the sequence number is correct and then passes checkpoint 324 to translator for secondary 314. Translator for secondary 314 translates checkpoint 324 into new version checkpoint 326 and deliver checkpoint 326 to new version secondary object 316. New version secondary object 316 is then available to be promoted to a primary object if node 302 should fail.

Invoking a New Version Primary Object

Figure 4:
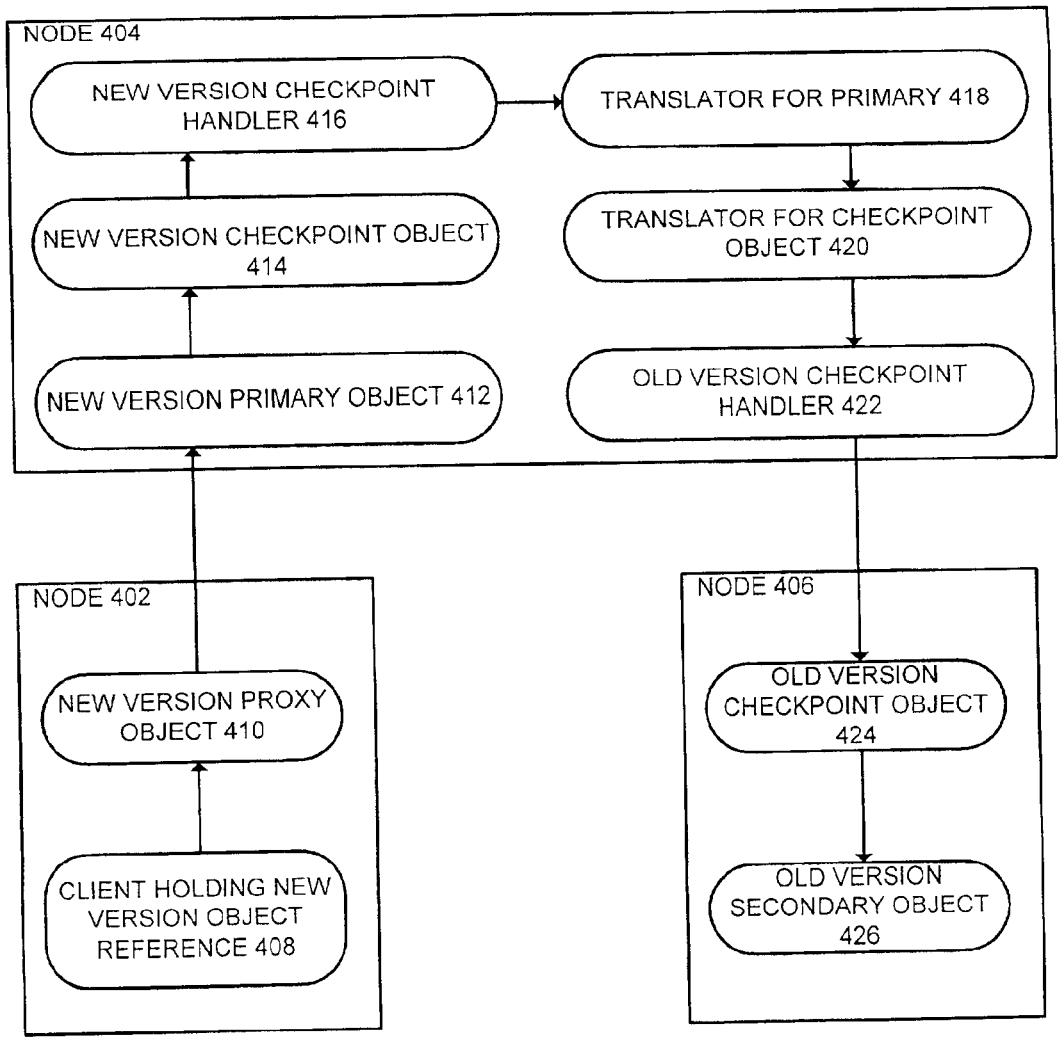
FIG. 4 illustrates a client invoking a new primary object that delivers a checkpoint to an old version secondary object in accordance with an embodiment of the present invention.

FIG. 4 illustrates a client invoking a new primary object that delivers a checkpoint to an old version secondary object in accordance with an embodiment of the present invention. The system includes nodes 402, 404, and 406. Nodes 402, 404, and 406 can generally include any type of computer system, including, but not limited to, a computer system based on a microprocessor, a mainframe computer, a digital signal processor, a portable computing device, a personal organizer, a device controller, and a computational engine within an appliance.

Node 402 includes client holding new version object reference 408. The object reference is a reference to new version proxy object 410. New version proxy object 410 is a proxy for new version primary object 412 located at node 404. As described above, new version primary object 412 sends a checkpoint request to new version checkpoint object 414, which, in turn, sends a checkpoint to new version checkpoint handler 416.

New version checkpoint handler 416 sends this checkpoint to translator for primary 418, which translates the checkpoint to an old version checkpoint. This old version checkpoint is passed to translator for checkpoint object 420. Old version checkpoint handler 422 passes the old version checkpoint to old version checkpoint object 424 in node 406. Old version checkpoint object 424 delivers an old version checkpoint to old version secondary object 426 as described above.

Retrying an Operation

Figure 5:
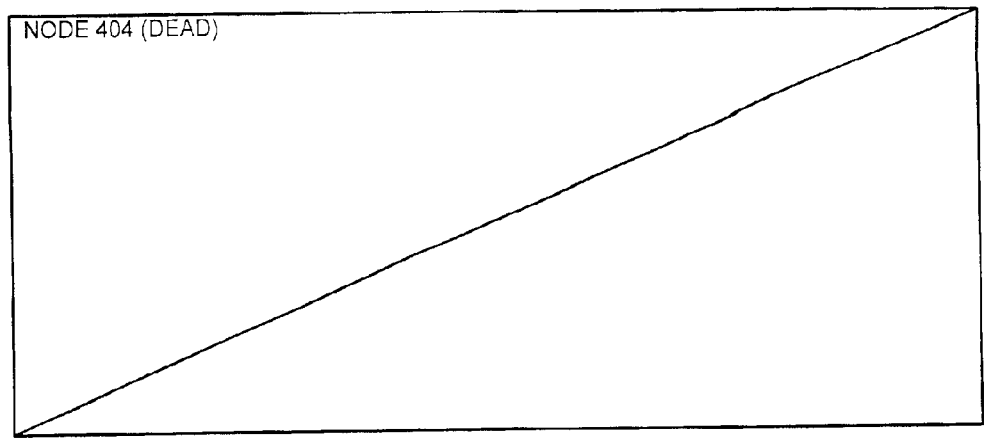
FIG. 5 illustrates a client retrying an operation with an old version primary object after a failure of a new version primary object in accordance with an embodiment of the present invention.
Figure 5:
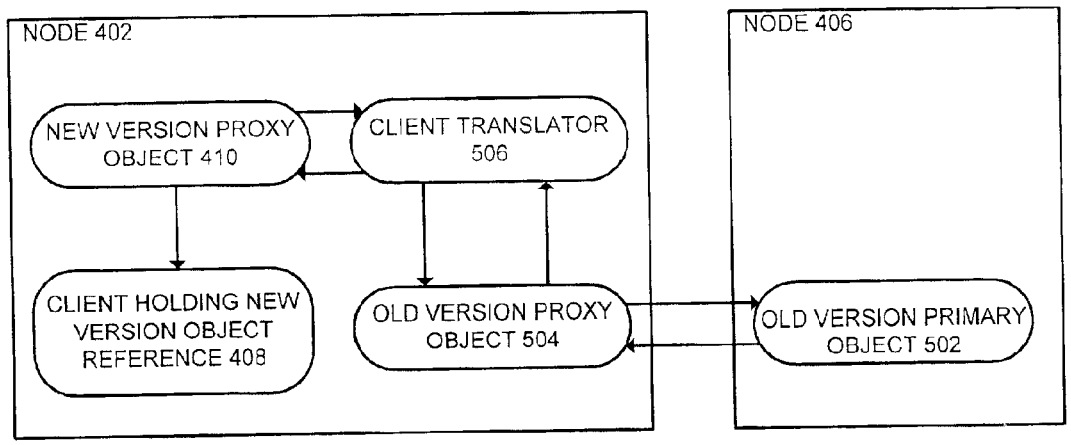

FIG. 5 illustrates a client retrying an operation with an old version primary object after a failure of a new version primary object in accordance with an embodiment of the present invention. In FIG. 5, Node 404 has failed shortly after delivering the checkpoint to old version secondary object 426 as described above in conjunction with FIG. 4. Old version secondary object 426 has been promoted to old version primary object 502. The system recognizes that the proxy object is a new version and the primary is old version. The system creates client translator 506 and old version proxy object 504. Client holding new version object reference 408 retries the operation with new version proxy object 410.

New version proxy object 410 sends a new version invocation to client translator 506. Client translator 506 translates the new version invocation into an old version invocation and sends this old version invocation to old version proxy object 504. Old version proxy object 504 invokes the newly promoted old version primary object 502.

Old version primary object 502 responds to old version proxy object 504. Client translator 506 translates the reply from old version proxy object 504 into a new version reply that is delivered to new version proxy object 410 so the transaction can be completed.

Distributing Checkpoints from New Version Primary

Figure 6:
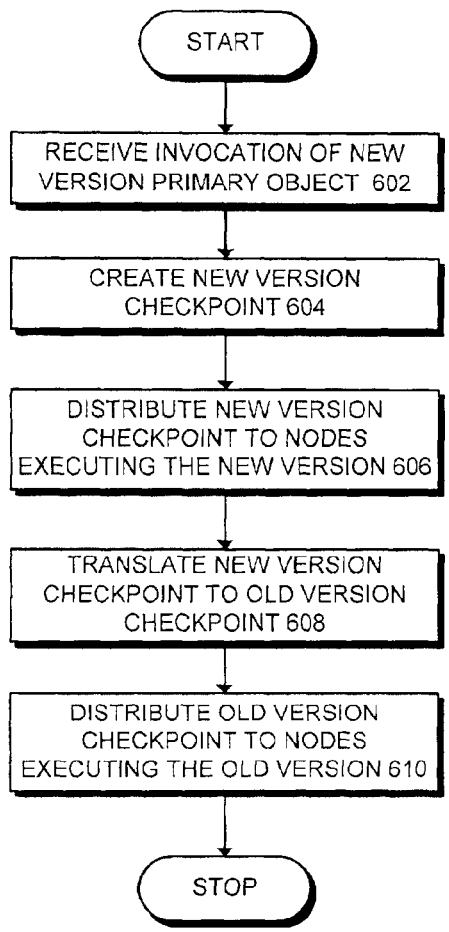
FIG. 6 is a flowchart illustrating the process of distributing a checkpoint of a new version primary object in accordance with an embodiment of the present invention.

FIG. 6 is a flowchart illustrating the process of distributing a checkpoint of a new version primary object in accordance with an embodiment of the present invention. The system starts when a node executing new version software receives an invocation of a new version primary object (step 602). Next, the system creates a new version checkpoint (step 604). After creating the new version checkpoint, the system distributes the new version checkpoint to nodes executing new version software (step 606).

The node executing new version software then translates the new version checkpoint to an old version checkpoint (step 608). Finally, the node distributes the old version checkpoint to nodes executing the old version software (step 610).

Distributing Checkpoints from Old Version Primary

Figure 7:
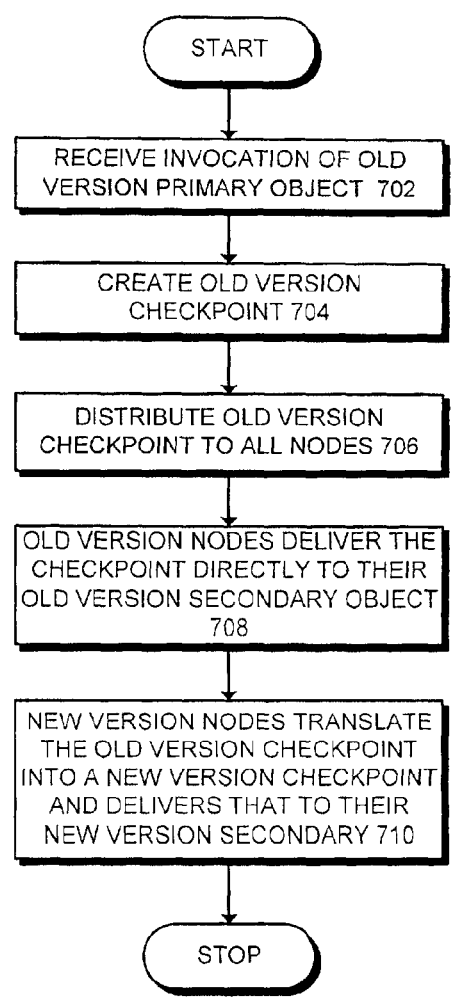
FIG. 7 is a flowchart illustrating the process of distributing a checkpoint of an old version primary object in accordance with an embodiment of the present invention.

FIG. 7 is a flowchart illustrating the process of distributing a checkpoint of an old version primary object in accordance with an embodiment of the present invention. The system starts when a node executing old version software receives an invocation of an old version primary object (step 702). Next, the system creates an old version checkpoint (step 704). After creating the old version checkpoint, the system distributes the old version checkpoint to all nodes (step 706).

Old version nodes deliver the checkpoint directly to their old version secondary object (step 708). New version nodes translate the old version checkpoint into a new version checkpoint, and deliver that to their new version secondary (step 710).

Retry of New Version Proxy with Old Version Primary

FIG. 8 is a flowchart illustrating the process of retrying an operation started with a new version primary object using an old version primary object in accordance with an embodiment of the present invention. The system starts when a node initiates an operation with a new version proxy object (step 802). Next, the node invokes a new version primary object on a node executing new version software (step 804). The new version primary object then creates a new version checkpoint (step 806).

The new version node translates the new version checkpoint into an old version checkpoint (step 808). Note that this node can also distribute the new version checkpoint to nodes executing new version software. The new version node delivers the old version checkpoint to the old version secondary object (step 810).

At some later point in time, the system detects failure of the node with the primary object (step 812). The system then promotes a secondary object to a primary object. For example, the system can promote an old version secondary object to a primary object (step 814).

The system then creates an old version proxy object and a client translator object on the client node (step 816). Next the client retries the invocation. The client translator converts the new version invocation into an old version invocation (step 818). The old version proxy delivers the old version invocation to the old version primary (step 820).

Retry of Old Version Proxy with New Version Primary

FIG. 9 is a flowchart illustrating the process of retrying an operation started with an old version primary object using a new version primary object in accordance with an embodiment of the present invention. The system starts when a node initiates an operation with an old version proxy object (step 902). Next, the node invokes an old version primary object on a node executing old version software (step 904). The old version primary object then creates an old version checkpoint (step 906).

After creating the old version checkpoint the node distributes the old version checkpoint to nodes executing new version software (step 908). Note that this node can also distribute the old version checkpoint to nodes executing old version software. The node executing the new version software then translates the old version checkpoint into a new version checkpoint, and delivers the new version checkpoint to the new version secondary object (step 910).

At some later point in time, the system detects failure of the node with the primary object (step 912). The system then promotes a secondary object to a primary object. For example, the system can promote the new version secondary object to a primary object (step 914).

The client resends the old version invocation to the node hosting the new version primary (step 916). The new version node translates the old version invocation into a new version invocation (step 918). The system delivers the new version invocation to the new version primary object, which retries the operation (step 920).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing multiple-version object support for highly available objects, comprising:
   receiving a change to a new version primary object at a node running new version primary software from a client node holding a new version proxy object, wherein the new version primary object is a highly available object;
   creating a new version checkpoint from the new version primary object;
   distributing the new version checkpoint to nodes executing new version software;
   translating the new version checkpoint into an old version checkpoint; and
   distributing the old version checkpoint to nodes executing old version software.

2. The method of claim 1, wherein receiving the change to the new version primary object includes receiving an invocation for the new version primary object.

3. The method of claim 1, further comprising delivering the new version checkpoint to a new version secondary object at a node executing new version software.

4. The method of claim 3, upon detecting failure of a node hosting the new version primary object, the method further comprises:
   promoting the new version secondary object to be a promoted new version primary object; and
   retrying an operation using the promoted new version primary object.

5. The method of claim 1, further comprising delivering the old version checkpoint to an old version secondary object at a node executing old version software.

6. The method of claim 5, upon detecting failure of a node hosting the new version primary object, the method further comprises:
   promoting the old version checkpoint to be a promoted old version checkpoint;
   translating the promoted old version invocation into a translated new version invocation for access by the client node; and
   retrying the translated new version invocation on an old version primary object.

7. A method for providing multiple-version object support for highly available objects, comprising:
   receiving a change to an old version primary object at a node running old version primary software from a client node holding an old version proxy object, wherein the old version primary object is a highly available object;
   creating an old version checkpoint from the old version primary object;
   distributing the old version checkpoint to nodes executing old version software;
   distributing the old version checkpoint to nodes executing new version software; and
   translating the old version checkpoint into a new version checkpoint.

8. The method of claim 7, wherein receiving the change to the old version primary object includes receiving an invocation for the old version primary object.

9. The method of claim 7, further comprising delivering the old version checkpoint to an old version secondary object at a node executing old version software.

10. The method of claim 9, upon detecting failure of a node hosting the old version primary object, the method further comprises:
    promoting the old version secondary object to be a promoted old version primary object; and
    retrying an operation using the promoted old version primary object.

11. The method of claim 7, further comprising:
    delivering the old version checkpoint to nodes executing new version software;
    wherein the old version checkpoint is translated into the new version checkpoint.

12. The method of claim 11, upon detecting failure of a node hosting the old version primary object, the method further comprises:
    promoting the new version secondary object to be a promoted new version primary object; and
    retrying an operation using the translator to translate an old version invocation into a new version invocation.

13. A computer-readable storage medium storing instructions that when executed by a computer cause the computer to perform a method for providing multiple-version object support for highly available objects, the method comprising:

receiving a change to a new version primary object at a node running new version primary software from a client node holding a new version proxy object, wherein the new version primary object is a highly available object;

creating a new version checkpoint from the new version primary object;

distributing the new version checkpoint to nodes executing new version software;

translating the new version checkpoint into an old version checkpoint; and distributing the old version checkpoint to nodes executing old version software.

14. The computer-readable storage medium of claim 13, wherein receiving the change to the new version primary object includes receiving an invocation for the new version primary object.

15. The computer-readable storage medium of claim 13, the method further comprising distributing the new version checkpoint to a new version secondary object at a node executing new version software.

16. The computer-readable storage medium of claim 15, upon detecting failure of a node hosting the new version primary object, the method further comprises:

promoting the new version secondary object to be a promoted new version primary object; and retrying an operation using the promoted new version primary object.

17. The computer-readable storage medium of claim 13, the method further comprising distributing the old version checkpoint to an old version secondary object at a node executing old version software.

18. The computer-readable storage medium of claim 17, upon detecting failure of a node hosting the new version primary object, the method further comprises:

promoting the old version secondary object to be a promoted old version primary object;

translating a new version invocation into an old version invocation; and retrying the operation using the translated invocation by the old version primary object.

19. A computer-readable storage medium storing instructions that when executed by a computer cause the computer to perform a method for providing multiple-version object support for highly available objects, the method comprising:

receiving a change to an old version primary object at a node running old version primary software from a client node holding an old version proxy object, wherein the old version primary object is a highly available object;

creating an old version checkpoint from the old version primary object;

distributing the old version checkpoint to nodes executing old version software;

distributing the old version checkpoint to nodes executing new version software; and translating the old version checkpoint into a new version checkpoint.

20. The computer-readable storage medium of claim 19, wherein receiving the change to the old version primary object includes receiving an invocation for the old version primary object.

21. The computer-readable storage medium of claim 19, the method further comprising distributing the old version checkpoint to an old version secondary object at a node executing old version software.

22. The computer-readable storage medium of claim 21, upon detecting failure of a node hosting the old version primary object, the method further comprises:

promoting the old version secondary object to be a promoted old version primary object; and retrying an operation using the promoted old version primary object.

23. The computer-readable storage medium of claim 19, the method further comprising distributing the new version checkpoint to a new version secondary object at a node executing new version software.

24. The computer-readable storage medium of claim 23, upon detecting failure of a node hosting the old version primary object, the method further comprises:

promoting the new version secondary object to be a promoted new version primary object;

translating the old version invocation into a new version invocation; and retrying an operation using the translated invocation at the new version primary object.

25. An apparatus for providing multiple-version object support for highly available objects, comprising:

a receiving mechanism that is configured to receive a change to a new version primary object at a node running new version primary software from a client node holding a new version proxy object, wherein the new version primary object is a highly available object;

a creating mechanism that is configured to create a new version checkpoint from the new version primary object;

a first distributing mechanism that is configured to distribute the new version checkpoint to nodes executing new version software;

a first translating mechanism that is configured to translate the new version checkpoint into an old version checkpoint; and a distributing mechanism that is configured to distribute the old version checkpoint to nodes executing old version software.

26. The apparatus of claim 25, wherein receiving the change to the new version primary object includes receiving an invocation for the new version primary object.

27. The apparatus of claim 25, further comprising a delivering mechanism that is configured to deliver the new version checkpoint to a new version secondary object at a node executing new version software.

28. The apparatus of claim 27, further comprising:

a promoting mechanism that is configured to promote the new version secondary object to be a promoted new version primary object; and a retrying mechanism that is configured to retry an operation using the promoted new version primary object.

29. The apparatus of claim 25, further comprising a delivering mechanism that is configured to deliver the old version checkpoint to an old version secondary object at a node executing old version software.

30. The apparatus of claim 29, further comprising:

a promoting mechanism that is configured to promote the old version secondary object to be a promoted old version primary object;

a second translating mechanism that is configured to translate new version invocations into old version invocations; and a retrying mechanism that is configured to retry an operation using the translated new version invocation.

31. An apparatus for providing multiple-version object support for highly available objects, comprising:
- a receiving mechanism that is configured to receive a change to an old version primary object at a node running old version primary software from a client node holding an old version proxy object, wherein the old version primary object is a highly available object;
- a creating mechanism that is configured to create an old version checkpoint from the old version primary object;
- a distributing mechanism that is configured to distribute the old version checkpoint to nodes executing old version software;
- wherein the distributing mechanism is further configured to distribute the old version checkpoint to nodes executing new version software; and
- a first translating mechanism that is configured to translate the old version checkpoint into a new version checkpoint.

32. The apparatus of claim 31, wherein receiving the change to the old version primary object includes receiving an invocation for the old version primary object.

33. The apparatus of claim 31, further comprising a delivering mechanism that is configured to deliver the old version checkpoint to an old version secondary object at a node executing old version software.

34. The apparatus of claim 33, further comprising:
- a promoting mechanism that is configured to promote the old version secondary object to be a promoted old version primary object; and
- a retrying mechanism that is configured to retry an operation using the promoted old version primary object.

35. The apparatus of claim 31, further comprising:
- a delivering mechanism that is configured to deliver old version checkpoints to nodes running new version software; and
- a translating mechanism that is configured to translate old version checkpoints into new version checkpoints.

36. The apparatus of claim 35, further comprising:
- a promoting mechanism that is configured to promote a new version secondary object to be a promoted new version primary object;
- a second translating mechanism that is configured to translate a promoted new version invocation into a translated old version invocation; and
- a retrying mechanism that is configured to retry an operation using the translated old version invocation.

* * * * *